July 24, 1934.  T. V. BUCKWALTER  1,967,806
RAILWAY TRUCK CONSTRUCTION
Filed June 29, 1932   3 Sheets-Sheet 1
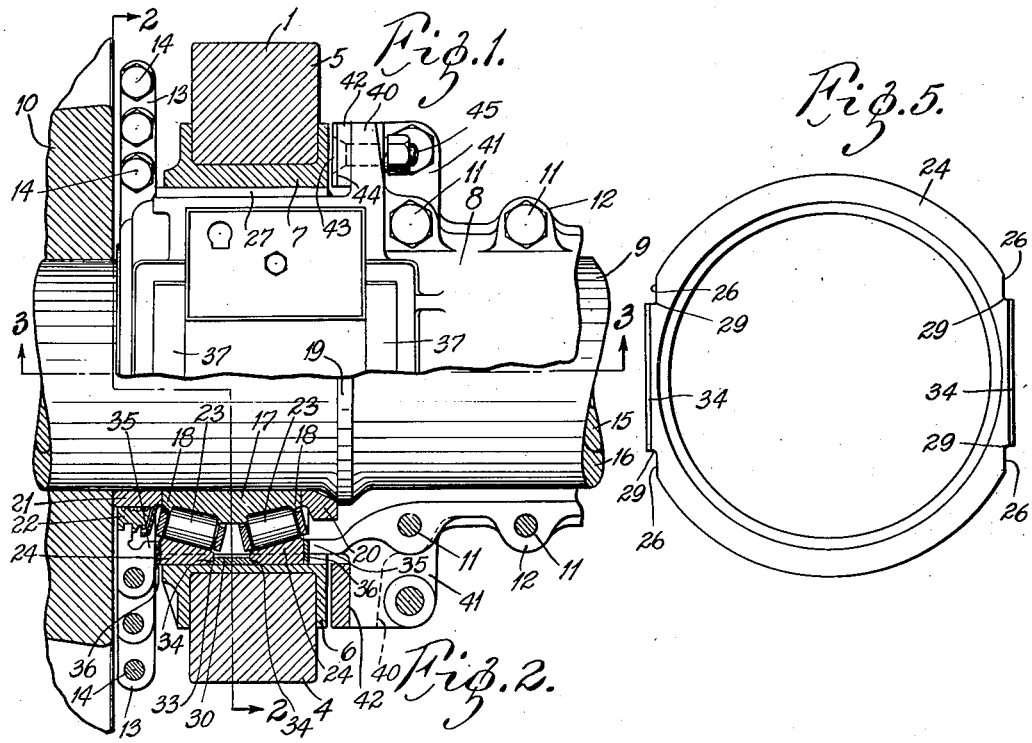
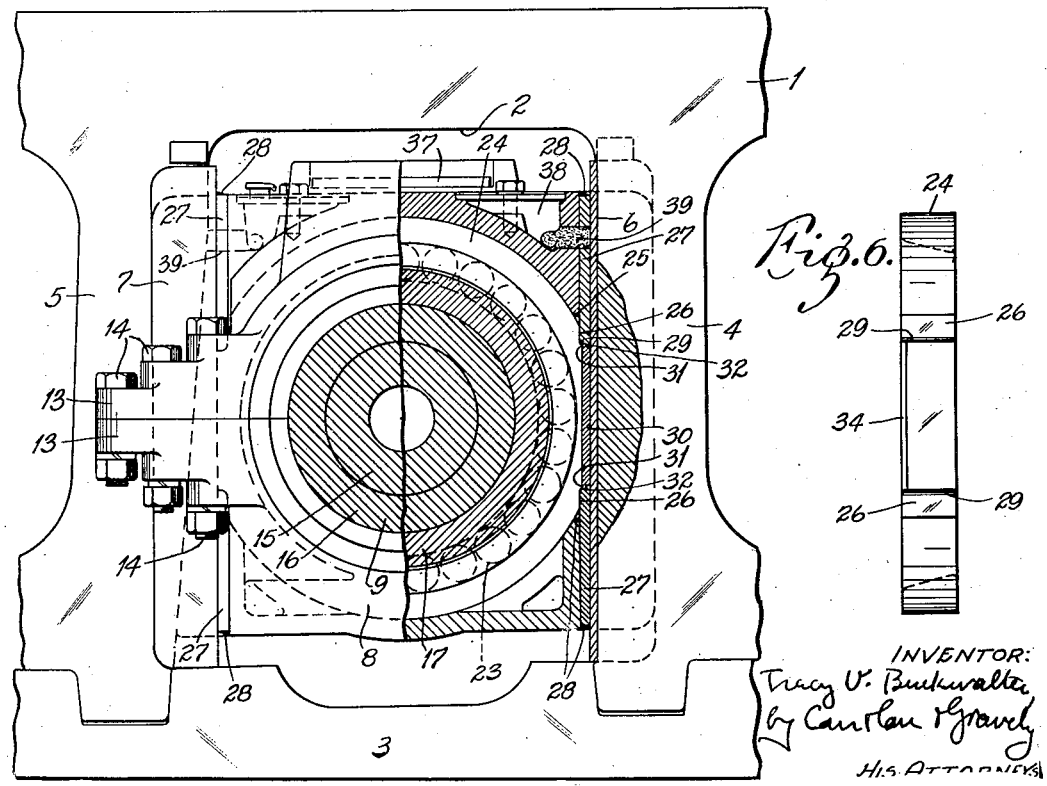
INVENTOR:
Tracy V. Buckwalter
by Cantlan & Gravely
HIS ATTORNEYS

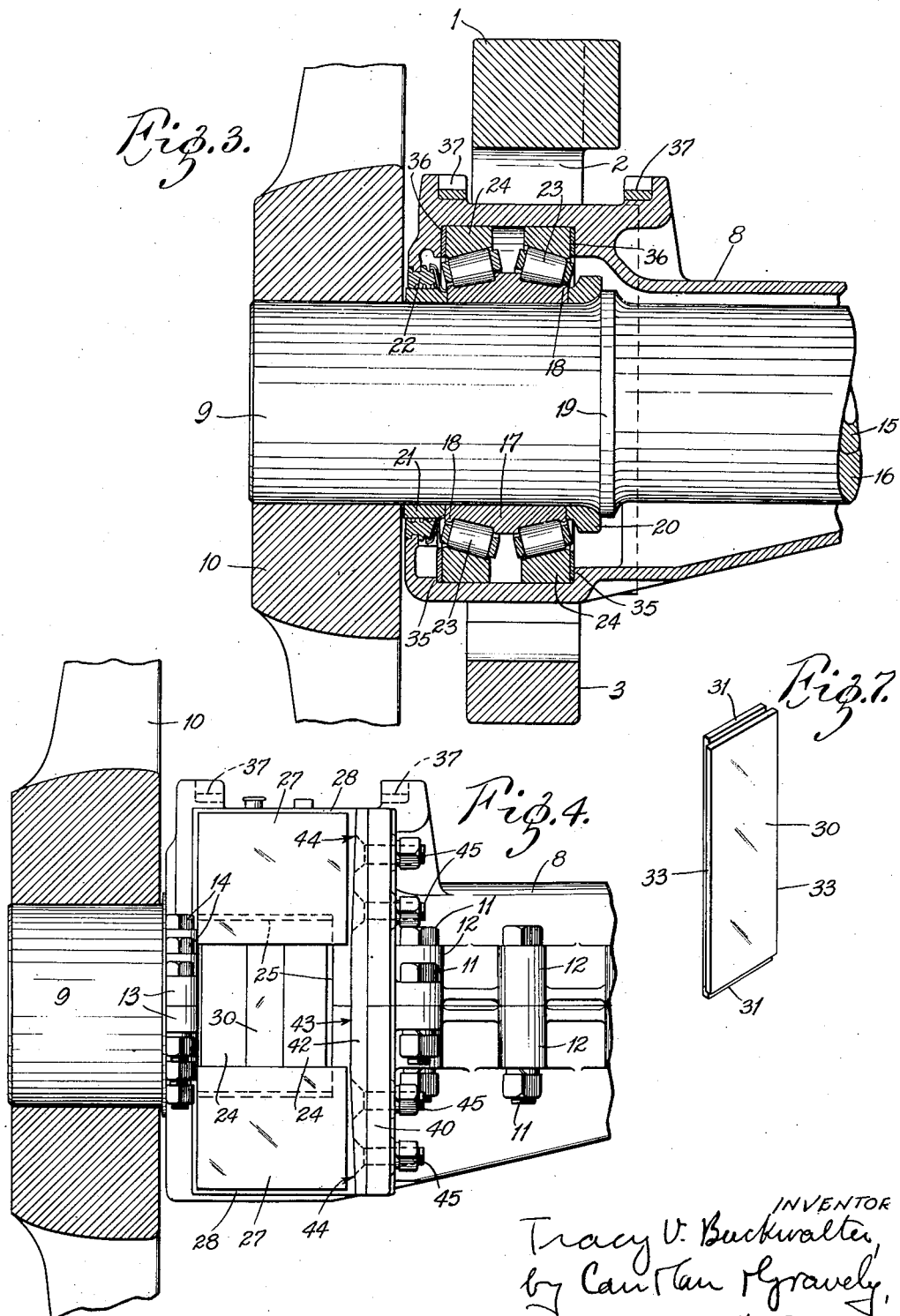

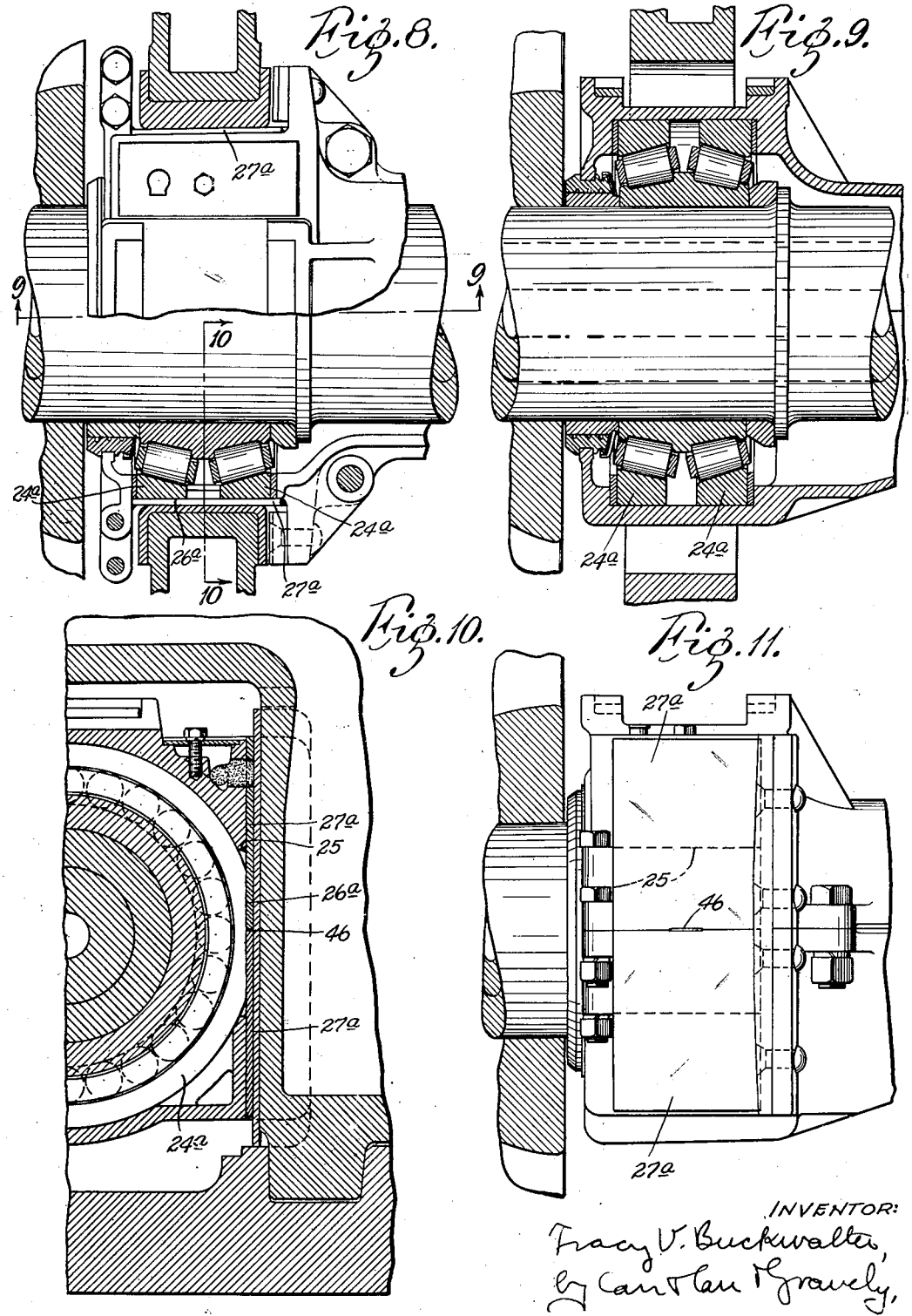

Patented July 24, 1934

1,967,806

UNITED STATES PATENT OFFICE 1,967,806

RAILWAY TRUCK CONSTRUCTION

Tracy V. Buckwalter, Canton, Ohio, assignor to The Timken Roller Bearing Company, Canton, Ohio, a corporation of Ohio Application June 29, 1932, Serial No. 619,879

15 Claims. (Cl. 308—180)

My invention relates to railway trucks, particularly to the axle housing and bearing parts of such trucks. It is extremely difficult to install roller bearings in conventional railway truck frames adapted for plain bearings due to the increased size of the roller bearings over the plain ones. This is particularly true in the case of integrally cast locomotive truck frames wherein it is impracticable to make the frame openings large enough to accommodate the usual type of roller bearing axle housing assemblies.

The principal object of this invention is to provide a roller bearing axle assembly for a railway truck which will have the same effective strength as that of the usual type of such assemblies, but which will be narrower in width than the usual type, so that it can be installed in a plain bearing truck frame without widening the axle openings thereof.

The invention consists principally in making the side portions of the outer bearing members of a roller bearing axle housing assembly of less sectional area than its top and bottom portions by flattening the sides of the outer bearing members whereby the width of the bearing is reduced without decreasing its strength at the points needed since the side portions of the outer bearing members receive considerably less radial load than its other portions. The invention also consists in having openings in the sides of the axle housing so that the flat sides of the bearing members will be engaged by the wear members at the sides of the frame openings for preventing the outer bearing members from rotating in their seats in the housing and also for reinforcing them. The invention also consists in the parts, combinations, and arrangements of parts hereinafter described and claimed.

In the accompanying drawings which form part of this specification and wherein like symbols refer to like parts wherever they occur, Fig. 1 is a horizontal sectional view along the middle of an end portion of an axle housing assembly embodying my invention and mounted in the side frame opening of a railway truck, with a portion of the axle housing shown in plan.

Fig. 2 is a vertical sectional view along the line 2—2 in Fig. 1,

Fig. 3 is a vertical sectional view along the line 3—3 in Fig. 1,

Fig. 4 is a side elevation of the end portion of the axle housing assembly before it is mounted in the truck frame, Fig. 5 is an end view of one of the roller bearing cups used in the construction disclosed in Fig. 1, Fig. 6 is a side elevation of the cup shown in Fig. 5, Fig. 7 is a perspective view of one of the plates used in the construction disclosed in Fig. 1 for enclosing the space between the bearing cups at their outer sides, Fig. 8 is a view similar to Fig. 1 showing a modification of my invention, Fig. 9 is a vertical sectional view along the line 9—9 in Fig. 8, Fig. 10 is an enlarged vertical sectional view along the line 10—10 in Fig. 8, and Fig. 11 is a side elevation of an end portion of the modified form of axle housing assembly, being a view similar to Fig. 4 of the preferred form.

In the accompanying drawings, I have shown a conventional integrally cast locomotive truck side frame 1 having an axle opening 2 defined by pedestals whose bottoms are connected by a pedestal tie member 3. The pedestal 4 on one side of the opening extends vertically, whereas the pedestal 5 on the other side thereof is inclined to make the opening wider at its bottom. The vertical pedestal 4 has a channel-shaped frame liner 6 fitted around it, and the inclined pedestal 5 has a channel-shaped frame liner 7 fitted around it which has a wedge-shaped web for cooperating with the pedestal to vary the width of the opening between the liners as is customary in trucks of this type.

In the preferred form of my invention shown in Figs. 1 to 7, inclusive, an axle housing 8, enclosing an axle 9 with a wheel 10 fixed on its end, is mounted within the frame opening 2. The housing 8 is split along its horizontal center line, and the two half sections thereof are held together on the inside of the truck side frame by bolts 11 extending through oppositely disposed lugs 12 projecting outwardly from the two half sections of the housing along their adjoining edges. The ends of the two half sections of the housing on the outside of the truck side frame have stepped flange portions 13 projecting laterally outward from each side thereof. These flange portions 13 have a series of bolts 14 extending through them so as to firmly secure the outer end portions of the two half sections of the housing together; and while I have shown only one end of the axle housing in the drawings, it is to be understood that the axle housing at its opposite end is of similar construction.

The axle comprises inner and outer tubular members 15 and 16, respectively, having substantially similar sectional areas. With this type of axle, each part thereof can be heat treated separately; and hence, the composite axle can be comparatively reduced with respect to a conventional solid axle and still have at least the same strength as that of a solid axle of the same kind of material which cannot be heat treated properly. Mounted on the axle in the end of the housing is a double cone 17 having its larger diameter at its middle and having its raceways bordered by annular thrust ribs 18. The axle has an annular thrust rib 19 adjacent to the inner end of the cone, and a spacer ring 20 is mounted on the axle between the thrust rib and the cone with its respective ends abutting against the side of the rib and the end of the cone. A sleeve 21 is mounted on the axle between the wheel and the cone with its inner end abutting against the adjacent end of the cone; and mounted around this sleeve 21 is an enclosure ring 22 having its outer periphery engaging the wall of the axle opening through the end of the axle housing. Mounted around the raceways of the cone are circular sets of rollers 23. Seated in the housing and mounted around the rollers are bearing cups 24. The sides of the axle housing opposite the respective frame liners have rectangular openings 25 therethrough for accommodating the side portions of the bearing cups 24; and the sides of the bearing cups outside the housing having flat surface portions 26 which engage the wear surfaces of the frame liners. Interposed between each frame liner and the adjacent side of the axle housing above and below the rectangular opening 25 therethrough, respectively, are flat wear plates 27 which are secured to the housing as by welding 28. The lower wear plate extends slightly above the bottom edge of the opening 25, whereas the upper wear plate extends slightly below the top edge thereof; and the bearing cups 24 have transverse grooves 29 in their outer peripheries adjacent to the upper and lower ends of the flat side portions thereof, respectively, for accommodating the edge portions of the wear plates extending beyond the edges of the opening 25 in the side of the housing.

Mounted between the bearing cups 24 at each side of the bearing is a narrow, flat plate 30 having its outer face engaging the wear surface of the frame liner. This plate 30 serves as a means for enclosing the space between the two bearings cups, and it has tongues 31 extending from its upper and lower edges, respectively, which project into grooves 32 provided therefor in the bottom and top edges of the upper and lower wear plates, respectively. The enclosure plate 30 also has tongues 33 extending from its side edges which project into recesses 34 provided therefor in the adjacent ends of the bearing cups along the edges of their flat side surface portions. Interposed between the ends of the two bearing cups 24 at each end of the bearing and annular shoulders 35 formed in the axle housing adjacent thereto and constituting a continuation of the side walls of the openings 25, are flat adjustment rings 36 conforming in shape to the ends of the bearing cups.

The top of the axle housing is provided with the usual seats 37 for equalizer members (not shown), and it is also provided with lubricant reservoirs 38 having plugs 39 of felt, or like material, extending through the side walls thereof and engaging the wear surfaces of the frame liners for lubricating them.

Each side of the axle housing on the inside of the truck frame has an integral vertical flange portion 40 extending therefrom which is braced by horizontal webs 41. Secured to each vertical flange portion 40 is a thrust block 42 having a central flat thrust surface 43 facing the exposed side face of the inner side flange of the frame liner and flat thrust surfaces 44 above and below its central part, respectively, which are inclined away from the frame liner to allow the axle to tilt endwise. The thrust blocks 42 are secured to the vertical flange portions 40 of the housing by means of bolts 45 having their heads countersunk in the thrust blocks.

In the construction shown in Figs. 8 to 10, inclusive, and illustrating the modified form of my invention, the bearing cups 24a have their flat side surface portions 26a extending in vertical alinement with the outer side surfaces of the axle housing; and the upper and lower wear plates 27a which are welded to each side of the axle housing are extended so as to meet each other at the horizontal center line of the opening 25 through the side of the housing; and instead of the flat side portions of the bearing cups engaging the wear face of the frame liner, as in the preferred form of my invention, they engage the inner faces of the flat wear plates.

In this form of my invention, I prefer to cut away the central parts of the adjoining edges of one of the wear plates to form a horizontal slot 46 between the two wear plates. This slot 46, obviously, opens into the space occupied by the bearings, and due to the position of the bearings, the rollers tend to pump lubricant from the outer end of the bearing toward the space between the bearings; accordingly, a pressure is established in this space which tends to force the lubricant through the slot 46 and over the wear surface of the frame liner.

A roller bearing axle assembly conforming to my invention is considerably narrower than the usual type of such assemblies so that it can be mounted on a conventional railway truck frame adapted for plain bearings without changing the size of the axle openings. Moreover, my axle housing assembly has the same strength at the points needed as that of the usual type of such assemblies.

The principal radial load imposed upon the bearings of railway truck axle housing is exerted upon the bearing parts above the axle and such parts receive considerably more radial load than those at the sides of the axle. Accordingly, in flattening the sides of the bearing cups to produce a roller bearing assembly which is narrower than the usual type, the strength of the bearings at the points needed is not decreased since the bearing parts above the axle are of normal size. Moreover, since the flat side surface portions of the cups directly engage the wear members at the sides of the axle housing, such wear members, besides preventing the cups from rotating in the housing, also tend to reinforce the reduced side portions of the cups.

With my axle housing construction, the endwise thrust of the axle is transferred to the comparatively large thrust flanges on the inside of the side frames, and they are arranged to limit the transverse movement of the axle housing with respect to the frame so that the outer connecting flanges for holding the two half sections of the housing together cannot engage the side frames. Accordingly, there is no chance of overstraining the parts of the axle housing adjacent to the openings therethrough for accommodating the outer side portions of the bearing cups.

Furthermore, my axle housing assembly is readily assembled and proper adjustment of the bearings is readily obtained. In order to adjust the bearings, the distances between the annular shoulders within the housing are measured; and it is to be noted that this measurement is readily obtained since the shoulders within the axle housing form a continuation of the side walls of the openings therein for accommodating the outer side portions of the bearing cups. With the bearings assembled on the axle, the distances between the ends of the cups are measured; and from these measurements, the proper thickness that the adjusting rings should be can be ascertained; and the adjusting rings can be machined to their proper size so that when they are assembled within the axle housing with the bearings, the bearings will be properly adjusted.

Obviously, the constructions hereinabove described admit of considerable variations without departing from the spirit of my invention; accordingly, I do not wish to be limited to the precise constructions shown and described.

What I claim is:

1. The combination of a housing adapted to fit an opening in a railway truck side frame with the capacity for vertical movement relative to the side frame during normal operation, said housing having its top arranged for cooperation with an equalizer member, an axle in said housing, and roller bearings including an outer bearing member interposed between said axle and said housing, said housing having an opening in its side for accommodating the outer side portion of said outer bearing member, the outside dimensions of said outer bearing member at said housing opening being less than the width of said frame opening said outer bearing member having its side portion of less cross-sectional area than its other portions and having a portion of its outer surface engaging the wear member at the side of said side frame opening.

2. The combination of a housing adapted to fit an opening in a railway truck side frame with the capacity for vertical movement relative to the side frame during normal operation, said housing having its top arranged for cooperation with an equalizer member, an axle in said housing, roller bearings including an outer bearing member interposed between said axle and said housing, said housing having an opening in its side for accommodating the outer side portion of said outer bearing member, the outside dimensions of said outer bearing member at said housing opening being less than the width of said frame opening and wear plates secured to the side of said housing above and below the opening therein, respectively, said outer bearing member having its side portion of less cross-sectional area than its other portions and having a portion of its outer surface engaging said wear plates.

3. The combination of a housing adapted to fit an opening in a railway truck side frame with the capacity for vertical movement relative to the side frame during normal operation, said housing having its top arranged for cooperation with an equalizer member, an axle in said housing, and roller bearings including an outer bearing member interposed between said axle and said housing, said housing having an opening in its side for accommodating the outer side portion of said outer bearing member, the outside dimensions of said outer bearing member at said housing opening being less than the width of said frame opening said outer bearing member having its side flattened adjacent to the outer end of the opening in the housing to form an outer flat surface portion which engages the inner face of the wear member at the side of said side frame opening.

4. The combination of a housing adapted to fit an opening in a railway truck side frame with the capacity for vertical movement relative to the side frame during normal operation, said housing having its top arranged for cooperation with an equalizer member, an axle in said housing, roller bearings including an outer bearing member interposed between said axle and said housing, said housing having an opening in its side for accommodating the outer side portion of said outer bearing member, the outside dimensions of said outer bearing member at said housing opening being less than the width of said frame opening and wear plates secured to said frame opening and wear plates secured to said housing above and below said opening therein, respectively, said outer bearing member having its side flattened to form an outer flat surface portion outside of said housing which engages the face of the wear member at the side of said side frame opening, said outer bearing member having transverse grooves in its outer periphery adjacent to the top and bottom ends of its flat surface portion, respectively, for receiving the lower edge portion of the upper wear plate and the upper edge portion of the lower wear plate, respectively.

5. The combination of a housing adapted to fit an opening in a railway truck side frame, an axle in said housing, roller bearings including a pair of spaced cups interposed between said axle and said housing, said housing having an opening in its side for accommodating the outer side portions of said cups, wear plates secured to the side of said housing above and below the opening therein, respectively, said cups having their sides flattened to form outer flat surface portions which engage the face of the wear member along the side wall of said side frame opening, an enclosure plate extending between said wear plates and said cups with its outer face engaging the face of the wear member at the side of said side frame opening, and means for holding said enclosure plate in place.

6. The combination of a housing adapted to fit an opening in a railway truck side frame, an axle in said housing, roller bearings including a pair of spaced cups interposed between said axle and said housing, said housing having an opening in its side for accommodating the outer side portions of said cups, wear plates secured to the side of housing above and below the opening therein, respectively, said cups having their sides flattened to form flat surface portions which engage the face of the wear member along the side wall of said side frame opening, and a flat enclosure plate extending between said wear plates and said cups with its outer face engaging the face of the wear member along the side wall of said frame opening, said enclosure plate having tongues extending from its side edges which project into recesses provided therefor in the adjacent ends of the cups along the edges of their flat side surface portions for holding said enclosure plate in place.

7. The combination of a housing adapted to fit an opening in a railway truck side frame, an axle in said housing, roller bearings including a pair of spaced cups interposed between said axle and said housing, said housing having an opening in its side for accommodating the outer side portions of said cups, wear plates secured to the side of said housing above and below the opening therein, respectively, said cups having their sides flattened to form outer flat surface portions which engage the face of the wear member along the side wall of said side frame opening, and a flat enclosure plate extending between said wear plates and said cups with its outer face engaging the face of the wear member along the side wall of said frame opening, said enclosure plate having tongues extending from its side edges which project into recesses provided therefor in the adjacent ends of the cups along the edges of their flat side surface portions, said enclosure plate also having tongues extending from its top and bottom edges, respectively, which project into grooves provided therefor in the adjacent edges of the wear plates.

8. The combination of a housing adapted to fit an opening in a railway truck side frame, an axle in said housing, roller bearings including an outer bearing member interposed between said axle and said housing, said housing having an opening in its side for accommodating the outer side portion of said outer bearing member, the outside dimensions of said outer bearing member at said housing opening being less than the width of said frame opening and wear plates secured to the side of said housing above and below said opening therein, respectively, and said outer bearing member having its side flattened to form an outer flat surface portion which engages said wear plates.

9. The combination of a housing adapted to fit an opening in a railway truck side frame, an axle in said housing, roller bearings including a pair of cups interposed between said axle and said housing, said housing having an opening in its side for accommodating the outer side portions of said cups, and wear plates secured to the sides of said housing with their edges meeting each other to close the opening in the side of said housing, said cups having their sides flattened to form flat surface portions which engage the inner faces of the wear plates, one of said wear plates being cut away at its edge meeting the edge of the other plate to form a slot between them communicating with the space between the cups whereby lubricant is forced by the bearing through said slot to lubricate the wear faces of the wear plates.

10. The combination of a housing adapted to fit an opening in a railway truck side frame with the capacity for vertical movement relative to the side frame during normal operation, said housing having its top arranged for cooperation with an equalizer member, an axle in said housing comprising an inner and outer tubular member, roller bearings including an outer bearing member interposed between said axle and said housing, said housing having an opening in its side for accommodating the side portion of said outer bearing member, the outside dimensions of said outer bearing member at said housing opening being less than the width of said frame opening and said outer bearing member having its side portion of less cross-sectional area than its other portions and having a portion of its outer surface engaging the wear member at the side of said frame opening.

11. The combination of a housing adapted to fit an opening in a railway truck side frame with the capacity for vertical movement relative to the side frame during normal operation, said housing having its top arranged for cooperation with an equalizer member, an axle in said housing comprising an inner and outer tubular member, roller bearings including an outer bearing member interposed between said axle and said housing, said housing having an opening in its side for accommodating the outer side portion of said outer bearing member, the outside dimensions of said outer bearing member at said housing opening being less than the width of said frame opening and said outer bearing member having its side flattened to form an outer flat surface portion for engaging the face of the wear member at the side of said frame opening.

12. The combination of a housing adapted to fit an opening in a railway truck side frame which is horizontally split into two half sections, an axle in said housing, roller bearings including an outer bearing member interposed between said axle and said housing, said housing having an opening in its side for accommodating the side portion of said outer bearing member, the two half sections of said axle housing having oppositely disposed flange portions extending therefrom outwardly of said side frame, means extending through said flange portions for connecting the two half sections of said housing together, and said axle housing having means inwardly of said side frame for engaging the same to prevent excessive transverse movement of said housing with respect to said side frame.

13. The combination of a housing adapted to fit an opening in a railway truck side frame, an axle in said housing, roller bearings interposed between said housing and said axle comprising a double cone mounted on said axle, said axle having a thrust rib thereon adjacent to the inner end of said cone, a ring on said axle having its ends abutting against said rib and said cone, respectively, sets of rollers mounted around said cone, cups mounted around said sets of rollers and seated in said housing, said housing having annular shoulders adjacent to the ends of the bearings and openings in its side for accommodating the outer side portion of said cups, the side walls of the openings constituting continuations of the shoulders, and flat adjustment rings interposed between said shoulders and said cups.

14. The combination of a housing adapted to fit an opening in a side frame, an axle in said housing, roller bearings including a pair of cups interposed between said axle and said housing, said housing having shoulders adjacent to the ends of said bearings, flat adjustment rings interposed between said shoulders and the adjacent ends of said cups, said housing having an opening in its side for accommodating the side portions of said cups, the side walls of the opening constituting continuations of the shoulders in the housing, and said cups having their side portions of less cross-sectional area than their other portions and having a portion of their outer surfaces engaging the wear members at the side of said side frame opening.

15. The combination of a housing adapted to fit an opening in a railway truck side frame with the capacity for vertical movement relative to the side frame during normal operation, said housing having its top arranged for cooperation with an equalizer member, an axle in said housing, roller bearings including an outer bearing member interposed between said axle and said housing, said housing having an opening in its side for accommodating the outer side portion of said outer bearing member, the outside dimensions of said outer bearing member at said housing opening being less than the width of said frame opening and wear plates secured to said housing above and below said opening therein, respectively.

TRACY V. BUCKWALTER.